United States Patent [19]

Parker

[11] 4,430,638
[45] Feb. 7, 1984

[54] AUTOMOBILE SAFETY LIGHT

[76] Inventor: Norman A. Parker, 10 W. Logan St., Philadelphia, Pa. 19144

[21] Appl. No.: 330,967

[22] Filed: Dec. 15, 1981

[51] Int. Cl.³ .......................... G08B 5/00; B60Q 1/00
[52] U.S. Cl. ..................................... 340/139; 340/87; 340/90; 340/107; 340/114 B; 340/123; 340/142; 362/162; 116/63 P; 40/550; 40/576
[58] Field of Search ........ 340/139, 137, 138, 140–143, 340/135, 127, 130, 110, 131, 120, 123, 84, 87, 90, 94, 103, 107, 114 R, 114 B, 321; 362/162; 116/40, 52–54, 63 R, 63 P; 40/541, 550, 571, 576, 591–597, 606, 610–612, 618

[56] References Cited
U.S. PATENT DOCUMENTS

| 1,864,464 | 6/1932 | Owen | 340/139 |
| 2,517,119 | 8/1950 | Le Duc | 340/87 |
| 2,669,705 | 2/1954 | Collins | 340/114 B |
| 3,810,092 | 5/1974 | Tucker | 340/114 B |

Primary Examiner—Donnie L. Crosland
Attorney, Agent, or Firm—David Edwards

[57] ABSTRACT

A warning and distress signal light for a disabled vehicle has a vertical cylindrical body having at its lower end a rubber suction cup and three folding legs with magnetic feet attached thereto for supporting the body. Attached at the upper portion of the cylindrical body are four illuminating arms which fold out horizontally from the vertical body spelling out the words CAUTION, AUTO, ACCIDENT and TROUBLE.

5 Claims, 7 Drawing Figures

FIG.3.
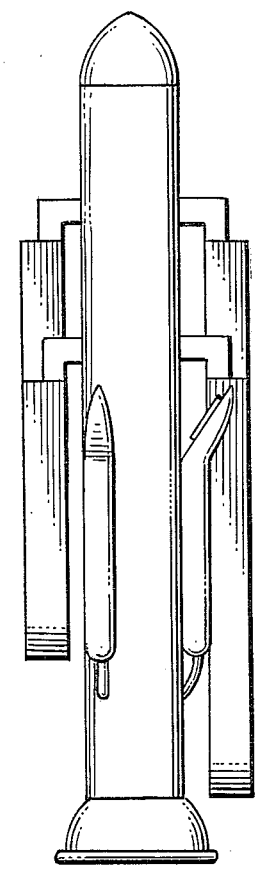
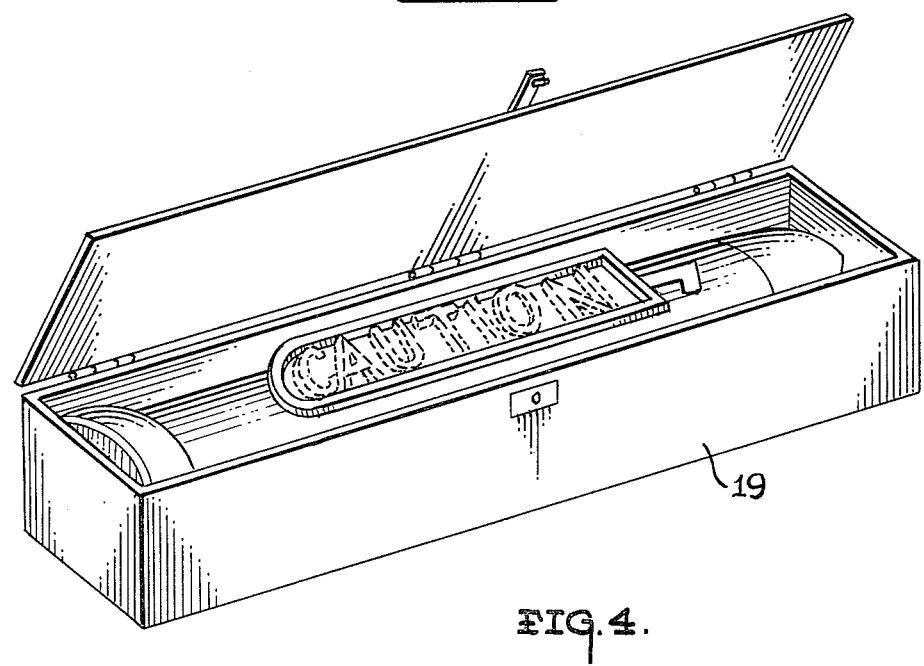
FIG.4.

AUTOMOBILE SAFETY LIGHT

BACKGROUND OF THE INVENTION

This invention relates to an improved construction for an illuminating signal device to indicate that a vehicle is in distress.

All too often, an accident occurs or an automobile becomes disabled in a remote stretch of highway wherein prompt effective assistance is inaccessible. Passing motorists are often reluctant to stop, particular if they are not aware that an emergency situation exists. Moreover, when an accident or automobile failure occurs, the disabled automobile may itself constitute a serious traffic hazard, even though the driver may be successful in pulling the automobile off the roadway. Commonly in such situations, flares are placed behind the vehicle to warn on-coming motorists. The flares are generally placed at ground level and may not become visible to the approaching driver until it is too late for the driver to avoid a collision.

Prior to the present invention there have been many other approaches to solving the problem of the warning of a disabled vehicle. U.S. Pat. Nos. 4,157,531, 3,810,092, 3,274,548, and 3,226,707 teach illuminating signalling devices that are placed either on top or in the vehicle, visible and blinking so as to inform oncoming traffic of the impending distress. None of these patents teaches the visibility for quick recognition that the instant invention has nor the compactness for easy handling and storage.

SUMMARY OF THE INVENTION

This invention is directed to a warning and distress signal device for a disabled vehicle comprising:

a cylindrical support body having a battery compartment in the upper end portion where a battery is secured by a top and a means for temporarily securing said device to a surface at the lower end portion;

a plurality of illuminating word light arms pivotally, hingedly connected to the upper portion but below the battery compartment of the upper end portion of the cylindrical support body which can be moved between a vertical position parallel to the cylindrical support body and an exposed position extending perpendicularly from the cylindrical support body;

means for energizing the arms for illuminating the words and borders in bright safety colors;

means for making the word lights and a portion of the border lights blink;

means for disconnecting the arms from the energizing means of the device so that when the arms are in the vertical position, the word lights and border lights are not lit up;

the word lights spell out the words CAUTION, ACCIDENT, AUTO, and TROUBLE; and the word light arms are hingedly selective to expose to passing motorists words citing the needs of the driver of the disabled vehicle.

BRIEF DESCIPTION OF DRAWINGS

FIG. I is a front elevation view of the distress signal and warning device having its arms in the extended position.

FIG. II is a front elevation view of the device with two light arms in the extended position and two arms in the folded down position showing a cut-a-way view of the extended arms and perforated schematic wiring circuitry.

FIG. III shows the device with all extensions in the folded in position.

FIG. IV shows the folded device in its carrying case.

FIG. V is an enlarged sectional view of the arm along lines V—V of FIG. II showing a cross-section of the arm.

FIG. VI is an enlarged sectional view of the upper right arm demonstrating how the letters are inserted in the arms.

FIG. VII is a view showing the wiring through a hinged joint.

DETAILED DESCRIPTION OF THE INVENTION

Figure 1:
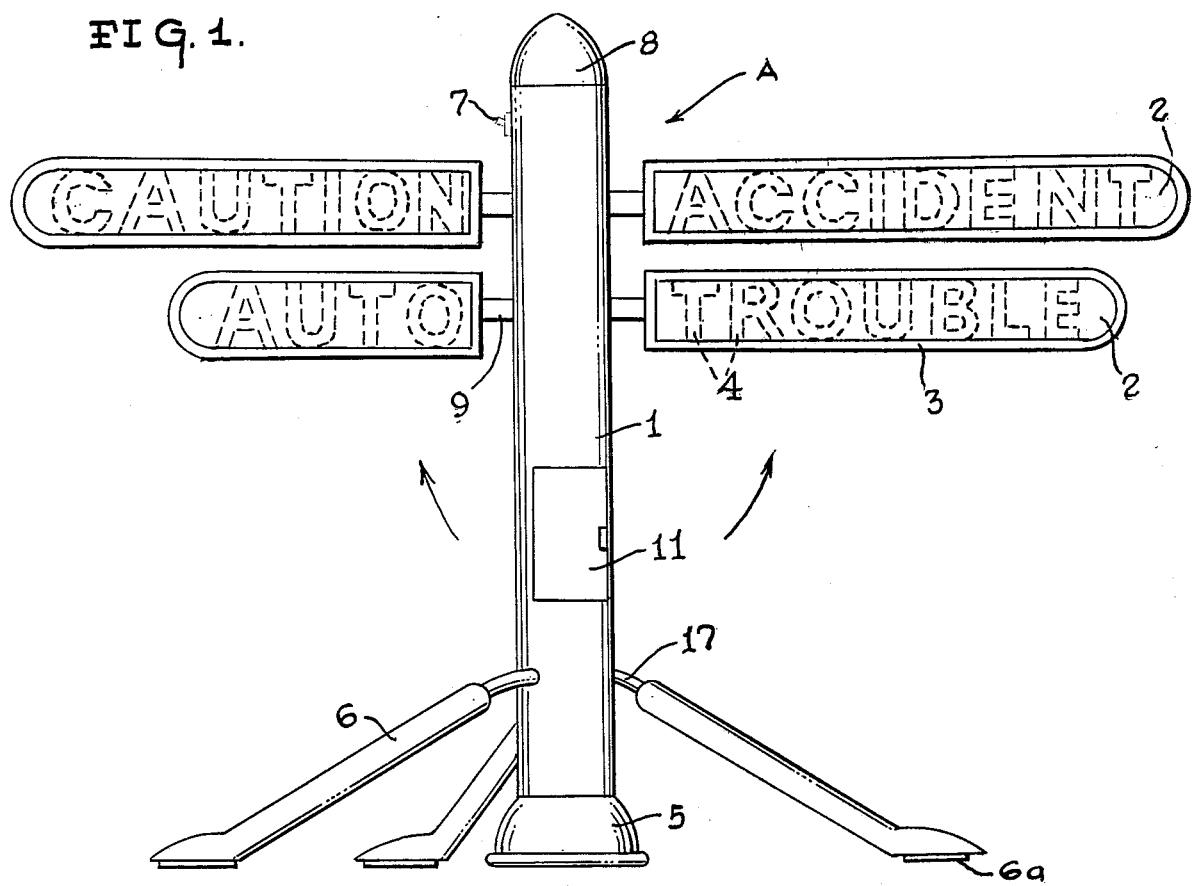
Figure 2:
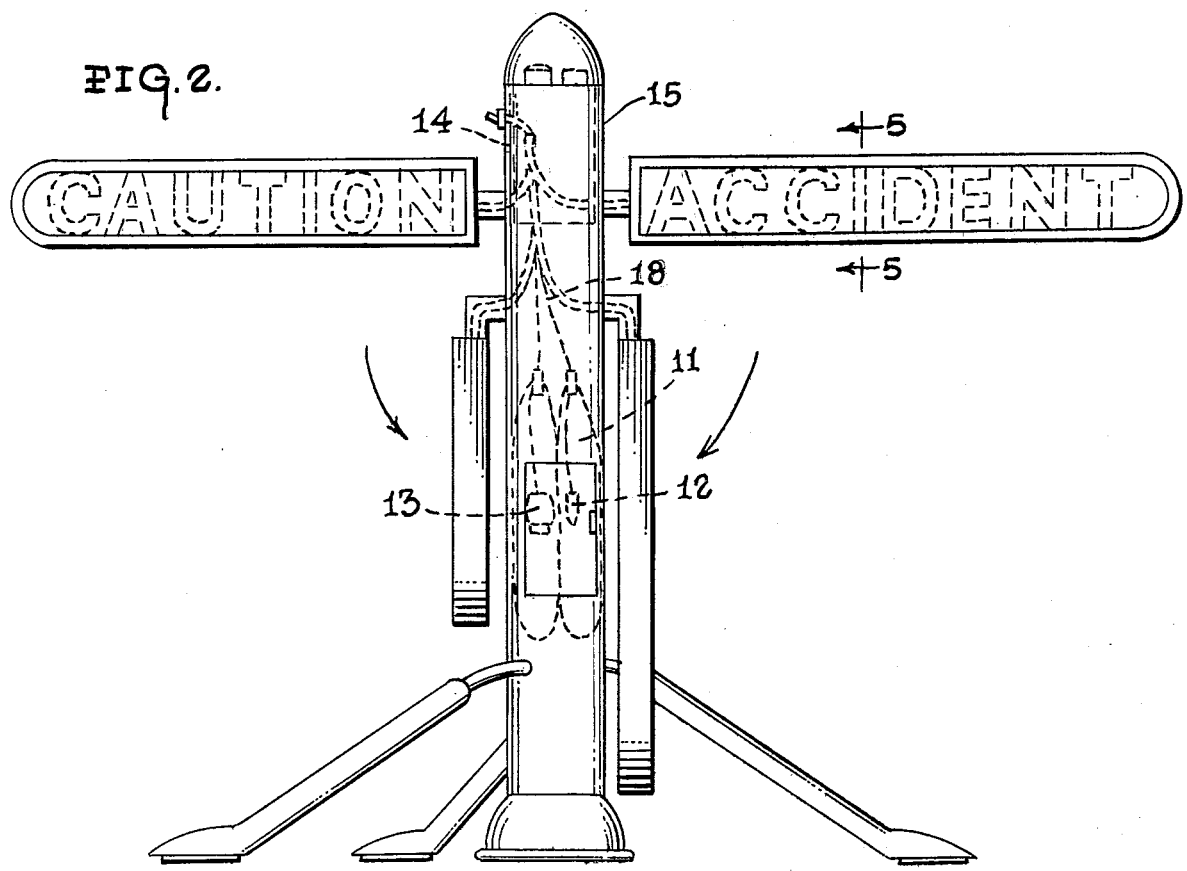
Figure 6:
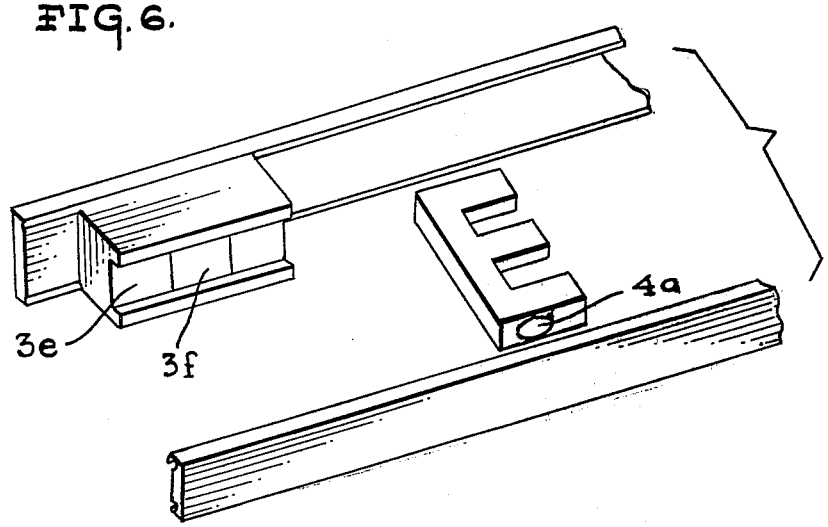
Figure 5:
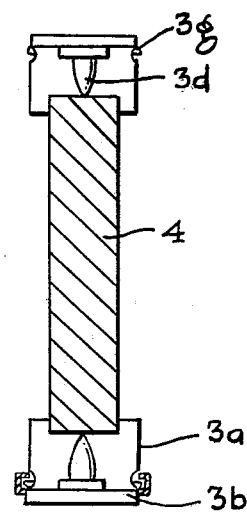
Figure 7:
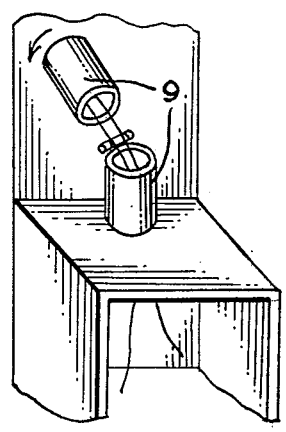

In carrying out this invention an effective signal and warning device is provided for use with a disabled vehicle comprising a cylindrical support body having pivotally, hinged light word arms connected thereto at one end and a rubber suction cup and tri-pod with magnetic feet at the other end for temporary attachment to the roof of a disabled vehicle. The arms are bright, illuminating, readily visible colors such as red letters with a yellow border. It should be understood that any bright colors normally used for distress signalling can be used for this device. A plurality of light word arms, i.e., four, are connected to the support body, two arms on each side staggerly positioned underneath each other so that when the arms are folded down the top arm does not overlap the arm below it. These word light arms convey a plurality of messages, each is a word designating a particular message of the disabled vehicle for oncoming traffic.

Each message word of an arm can be seen from the front and back of the device, since the words are composed of individual illuminating letters held together by an illuminating border. These letters and borders are made of a translucent, rigid or semi-rigid materials such as a plastic; these arms are extremely visible after dark and under severe weather conditions.

For example, the two top signs may carry the words CAUTION and ACCIDENT. Staggerly below these arms, the signs may carry the words that selectively describe another situation such as AUTO and TROUBLE. The yellow border lights have a conductor connected into a circuit interrupter which causes some of the lights in the border to flash (the lights adjacent to the holes in the ends of the letters).

Referring now to the drawing, the distress signalling and warning device A (see FIG. I) of this invention comprises a cylindrical support body 1 which may be formed of hard plastic, sheet metal such as aluminum or light weight steel or any other suitable rigid material. The word arms 2 are composed of borders 3 and illuminating letters 4 and are made of rigid or semi-rigid, translucent plastic or any other translucent materials. The word arms are attached to the support body 1 by a pivotal or swivel type hinge joint 9 (see FIG. VII) so that when the arms 2 are folded down they are parallel to the support body 1 in a relatively hidden position. When the arms are folded down, the electrical circuit in the arms are turned off by a three way switch 7; in the first position the lights are off, in a second position only the upper arms are turned on, and in the third position both upper and lower arms are turned on. The pivotal hinge joints 9 also provide for the arms to be screwed (or snapped) in and taken out for changing the arms, when desired.

FIGS. V and VI show the details of the structure of the letters 4 in the arms 3. The borders 3 are composed of two parts 3a and 3b. 3a is made of a hard plastic which snaps into a groove 3g on the edge of 3b and rides securely in the groove 3g. FIG. VI shows that 3a has a channel 3e with a hole 3f therein through which the light from bulb 3d illuminates. The letters 4 are hollow plastic translucent material with holes 4a in their ends which communicate with the hole 3f in the border portion 3a. The letters 4 move and are secured in channel 3e of the border 3 until the hole 3f in the groove 3g and the hole 4a of the letters 4 are aligned. The letters are held in the channels 3e by a biased force of the letters against the borders and a tight fit of the letters 4 in the channels 3e. The aligned holes 3f and 4a provide for the passage of light from the bulbs 3d adjacent the holes so that the hollow plastic letters 4 light up when the device is turned on. FIG. V shows a view V—V of FIG. II through the letter I.

FIG. II shows a cut-a-way view of the arms 2 showing generally a schematic layout of the wiring 18 of the device. The circuitry of the arms 2 are wired from the power source (battery) in compartment 15 through an on-off three-way switch 7 with some of the lights in the arms being wired through an interruptor 14 so that some of the lights in the arms blinks. The light bulbs adjacent the holes in the letters do not blink so that the letters are always illuminating. The device is also wired through electrical conductor 18 to a conventional plug 12 adapted for plugging into the receptable of the automobile cigarette lighter as an alternate source of power for illuminating the device. These electrical conductor 18 and plug 12 are located in storage compartment 11. A work light 13 is also wired into the circuitry of the device. The cigarette lighter plug 12 and work light 13 are secured on hooks when stored in storage compartment 11. The work light is also powered by the battery or the cigarette lighter.

The rubber or plastic suction caup base 5 is carried on the lower end of the cylindrical support body 1 and works in conjunction with folding tripod legs 6 with magnet bottom feet 6a for temporarily securing the device to a flat metal surface such as the roof of an automobile or other vehicle without damaging the paint finish thereon. The suction cup base 5 and tri-pod legs 6 can also support the device on a roadway or any other relatively flat surface of any material. Placing the device on the roof, however, enhances its visibility.

The top of the cylindrical support body 1 has a screw or snap on top 8 that encloses the battery compartment 15.

FIG. III shows the signalling device with all of the arms and tri-pod legs folded in for storage in a specially designed foam rubber lined carrying case 19 (FIG. IV), made of light gauge steel (or other suitable material) complete with handle, lock and key.

In operation, in the event of a mechanical breakdown of a vehicle on the highway, the driver of the disabled vehicle first attempts to move the vehicle off the road or highway onto the shoulder. Then, the distress signal and warning device A is taken from the trunk of the vehicle and out of its carrying case (see FIGS. IV and III); the tri-pod legs 6 are then spread out to the open position (see FIGS. I and II) and attached to the roof of the vehicle (for another highly visible place from the highway) by application of the suction cup base 5 and magnet feet 6a of the tri-pod legs 6. The appropriate word signs CAUTION and ACCIDENT and/or AUTO and TROUBLE are then folded out laterally and the switch 7 is energized. When the battery is used, the driver has more flexibility of the places that he can display his signaling device. For instance, he can set it on the ground around a curve in the highway, a great distance from the vehicle. Another safety feature of having the battery is that when the battery of the vehicle is completely dead, the signaling device can still be used effectively. The driver has the option of plugging the conductor plug 12 into the cigarette lighter receptacle of the automobile for illuminating the word arms to serve as a warning for on-coming traffic. The driver can then use the work light 13 for checking out the malfunction of his automobile if the distress occurs at night.

Thus, the device of this invention gives clear warning to on-coming traffic that there is an no impending obstacle to be avoided in the roadway ahead; it gives clear evidence to on-coming traffic that the vehicle is in fact disabled and in need of help. An on-coming motorist is obviously more likely to stop to offer assistance and to avoid becoming apart of the distress if he is aware of the impending trouble.

Although this invention has been discribed by preferred embodiments, it is obvious that modifications and changes therein can be made by those skilled in the art without departing from the spirit and scope of this invention.

What is claimed is:

1. A warning and distress signal device for a disabled vehicle comprising a cylindrical support body having an upper end portion and a lower end portion with a battery compartment in the upper end portion where a battery is secured therein by a capping means and a means for temporarily securing said device to a surface on the vehicle at the lower end portion, a plurality of illuminating word light arms wherein each word light arm is comprised of individually shaped letters held together by a border and is pivotally, hingedly connected to the upper end portion but below the battery compartment of the upper end portion of the cylindrical support body, said word light arms being able to move between a vertical position parallel to the cylindrical support body and an exposed position extending perpendicularly from the cylindrical support body, means for energizing the arms for illuminating the words and borders in bright safety colors, means for disconnecting the arms from the energizing means of the device when the arms are folded down to the position parallel to the cylindrical support body, and each of the illuminating word light arms expressing a driver's distress message in bright safety colors.

2. The device of claim 1 wherein the bright safety colors of the arms are bright red lights for the letters and yellow lights for the borders.

3. The device of claim 1 wherein the plurality of arms are four.

4. The device of claim 3 wherein the message word expressed in each arm is CAUTION, ACCIDENT, AUTO, and TROUBLE which may be exposed as described by the driver in distress.

5. The device of claim 1 wherein the means for energizing the device is a three-way energized through a battery or a cigarette lighter plug.

* * * * *